(12) United States Patent
Shao et al.

(10) Patent No.: US 12,468,278 B2
(45) Date of Patent: Nov. 11, 2025

(54) INTELLIGENT MANUFACTURING METHODS AND SYSTEMS BASED ON INDUSTRIAL INTERNET OF THINGS WITH A CENTRALIZED SERVICE PLATFORM

(71) Applicant: CHENGDU QINCHUAN IOT TECHNOLOGY CO., LTD., Sichuan (CN)

(72) Inventors: Zehua Shao, Chengdu (CN); Xiaojun Wei, Chengdu (CN); Haitang Xiang, Chengdu (CN); Bin Liu, Chengdu (CN); Yong Li, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/040,973

(22) PCT Filed: Apr. 24, 2022

(86) PCT No.: PCT/CN2022/088691
§ 371 (c)(1),
(2) Date: Feb. 7, 2023

(87) PCT Pub. No.: WO2023/205924
PCT Pub. Date: Nov. 2, 2023

(65) Prior Publication Data
US 2024/0255912 A1 Aug. 1, 2024

(51) Int. Cl.
*G05B 19/042* (2006.01)
(52) U.S. Cl.
CPC ............ *G05B 19/0426* (2013.01); *G05B 2219/23018* (2013.01)
(58) Field of Classification Search
CPC ...... G05B 19/0426; G05B 2219/23018; G05B 19/418; Y02P 90/02
See application file for complete search history.

(56) References Cited

U.S. PATENT DOCUMENTS

2020/0356084 A1* 11/2020 Zhu ................. G05B 23/027
2022/0043431 A1    2/2022 Sayyarrodsari et al.

FOREIGN PATENT DOCUMENTS

| CN | 105701745 A | * | 6/2016 |
| CN | 107835219 A |   | 3/2018 |

(Continued)

OTHER PUBLICATIONS

Notice of Rejection in Japanese Application No. 2023519148 mailed on Jun. 18, 2024, 14 pages.

(Continued)

*Primary Examiner* — Chad G Erdman
(74) *Attorney, Agent, or Firm* — METIS IP LLC

(57) ABSTRACT

The present disclosure provides an intelligent manufacturing method based on Industrial Internet of Things with a centralized service platform, including: the user platform inputting the parameter configuration information, and the service platform disassembling it into multiple sets of configuration data groups according to process; the management platform storing and processing the configuration data groups, and the configuration data group being used as a reference data group; the object platform taking the perception information as a verification data group at a set time interval; the management platform receiving and processing the verification data group, and sending the reference data group and the verification data group to the service platform; the service platform receiving and comparing the reference data group and the verification data group; if comparisons exceed the set threshold range, generating stop operation instructions and sending them to the object platform to control the production line device to stop running.

17 Claims, 8 Drawing Sheets

(56) References Cited

FOREIGN PATENT DOCUMENTS

| | | |
|---|---|---|
| CN | 108681288 A | 10/2018 |
| CN | 108693846 A | 10/2018 |
| CN | 108958196 A | 12/2018 |
| CN | 110109434 A | 8/2019 |
| CN | 113259483 A | 8/2021 |
| CN | 113408334 A | 9/2021 |
| CN | 113411361 A | 9/2021 |
| CN | 113885449 A | 1/2022 |
| CN | 113962439 A | 1/2022 |
| JP | H10125567 A | 5/1998 |
| JP | 2001326777 A | 11/2001 |
| JP | 2015211311 A | 11/2015 |
| JP | 2017083968 A | 5/2017 |
| JP | 2021002228 A | 1/2021 |
| WO | WO-2017013108 A1 * | 1/2017 ........... G06Q 10/063 |
| WO | 2020227429 A1 | 11/2020 |

OTHER PUBLICATIONS

International Search Report in PCT/CN2022/088691 mailed on Nov. 28, 2022, 8 pages.
Written Opinion in PCT/CN2022/088691 mailed on Nov. 28, 2022, 8 pages.
First Office Action in Chinese Application No. 202280006065.X mailed on Apr. 30, 2025, 25 pages.

* cited by examiner

300

```
┌─────────────────────────────────────────────────┐
│ The object platform sending the perception      │
│ information as a verification data group to the │
│ management platform through the sensor network  │
│ platform at a set time interval                 │
└─────────────────────────────────────────────────┘
                         ↓
┌─────────────────────────────────────────────────┐
│ The management platform receiving and           │
│ processing the verification data group sent by  │
│ the object platform, and sending the reference  │
│ data group and the verification data group      │
│ corresponding to the object platform that sends │
│ the verification data group to the service      │
│ platform                                        │
└─────────────────────────────────────────────────┘
                         ↓
┌─────────────────────────────────────────────────┐
│ The service platform receiving and comparing    │
│ the reference data group and the verification   │
│ data group, if comparison between all data in   │
│ the verification data group and the reference   │
│ data group are within a set threshold range,    │
│ the data being cleared and no subsequent        │
│ processing being performed, if the comparisons  │
│ between the data in the verification data group │
│ and the reference data group exceeds the set    │
│ threshold range, a stop operation instruction   │
│ being generated and sent to the management      │
│ platform and fed back to the user platform      │
└─────────────────────────────────────────────────┘
                         ↓
┌─────────────────────────────────────────────────┐
│ The management platform sending it to the       │
│ corresponding object platform through the       │
│ sensor network platform to control the          │
│ production line device to stop running          │
└─────────────────────────────────────────────────┘
```

- 410: Identifying the process, and acquiring the verification data group of the corresponding process by the management platform
- 420: Processing the verification data group through an abnormality judgment model to acquire a processed verification data group by the management platform
- 430: Judging whether the process is abnormal based on the processed verification data group by the service platform
- 440: In response to judging that the process is abnormal, sending the stop instruction to the management platform by the service platform, and controlling the production line device to stop processing the blank by the management platform

FIG. 4

INTELLIGENT MANUFACTURING METHODS AND SYSTEMS BASED ON INDUSTRIAL INTERNET OF THINGS WITH A CENTRALIZED SERVICE PLATFORM

CROSS-REFERENCE TO RELATED APPLICATIONS

This application is a U.S. national stage under 35 U.S.C. § 371 of International Application No. PCT/CN2022/088691, filed on Apr. 24, 2022, designating the United States of America, the entire contents of which are hereby incorporated by reference.

TECHNICAL FIELD

The present disclosure generally relates to a field of the technology of intelligent manufacturing, and in particular, to intelligent manufacturing methods and systems based on Industrial Internet of Things with a centralized service platform.

BACKGROUND

In recent years, the Industrial Internet of Things (IIoT) technology that integrates information technology and operation technology has developed rapidly, and its application in the intelligent manufacturing industry is also highly anticipated. At present, when the IIoT technology is applied in the intelligent manufacturing industry, it generally increases the diversity and scale by connecting and integrating different types of data acquisition devices, management and control systems, etc. In its application, it collects real-time status information and manufacturing data of field devices through data acquisition devices, provides users with real-time data such as required device and production progress, and solves problems such as automatic data collection, processing, statistics, and analysis, thereby improves manufacturing efficiency and optimizes resource allocation and management efficiency. However, the existing IIoT technologies suitable for intelligent manufacturing are generally developed for a single production project, compatible with a certain type of management and control system or a unique management and control system used by a user, lacking universality, timely and effective measures cannot be taken in the event of abnormal production, which seriously affects its popularization and application. For example, there are various processes for machining blanks, but the existing IIoT technology for intelligently processing blanks only manages and controls a certain process, and cannot be applied to other processes.

Therefore, it is hoped that an intelligent manufacturing method based on IIoT with a centralized service platform can be provided to manage and control various processes of processing blanks. This makes it possible to better monitor the process of processing blanks, and takes timely countermeasures when there is an abnormality in the process.

SUMMARY

One or more embodiments of the present disclosure provides an intelligent manufacturing method based on Industrial Internet of Things with a centralized service platform. The method includes a user platform, a service platform, a management platform, a sensor network platform, and an object platform that interact in sequence. The user platform is configured as a terminal device that interacts with a user, which receives input information of the user to generate an instruction and sends it to the service platform, and displays information sent by the service platform to the user. The service platform is configured as a first server, which receives the instruction sent by the user platform, processes and sends it to the management platform, and acquires information required by the user from the management platform and sends it to the user platform. The management platform is configured as a second server, which receives the instruction sent by the service platform and controls an operation of the object platform according to the instruction, and receives and stores perception information sent by the object platform. The sensor network platform is configured as a communication network and a gateway for the management platform to interact with the object platform. The object platform is configured as a production line device for performing manufacturing and a production line sensor for performing data collection, which receives the instruction from the management platform to run, and sends the perception information to the management platform through the sensor network platform. The service platform adopts a centralized arrangement, and the centralized arrangement means that a platform receives data uniformly, processes data uniformly, and sends data uniformly. Both the management platform and the sensor network platform adopt a rear sub-platform arrangement, the rear sub-platform arrangement means that the management platform and the sensor network platform are provided with a total platform and a plurality of sub-platforms, and control information and parameter configuration information of the object platform are transmitted from the sub-platform to the total platform, and the perception information is transmitted from the total platform to the sub-platform. The method includes: when configuring the object platform parameters, the user inputting the parameter configuration information of the object platform through the user platform, and the service platform receiving the parameter configuration information of the object platform sent by the user platform and disassembling it into multiple sets of configuration data groups according to process; the management platform storing and processing the received configuration data groups and sending them to the sensor network platform, and the stored configuration data group being used as a reference data group; the sensor network platform storing and processing the received configuration data groups and sending them to the object platform, and the object platform completing a parameter configuration of the object platform according to the parameter configuration information of the object platform; and when the production line device of the object platform is running, the object platform sending the perception information as a verification data group to the management platform through the sensor network platform at a set time interval; the management platform receiving and processing the verification data group sent by the object platform, and sending the reference data group and the verification data group corresponding to the object platform that sends the verification data group to the service platform; the service platform receiving and comparing the reference data group and the verification data group, if comparison between all data in the verification data group and the reference data group being within a set threshold range, the data being cleared and no subsequent processing being performed, if the comparisons between the data in the verification data group and the reference data group exceeding the set threshold range, a stop operation instruction being generated and sent to the management platform and fed back to the user platform, and the management platform sending it to the corresponding object platform through the sensor network platform to control the production line device to stop running.

One or more embodiments of the present disclosure provides an intelligent manufacturing system based on Industrial Internet of Things with a centralized service platform. The system includes a user platform, a service platform, a management platform, a sensor network platform, and an object platform that interact in sequence. The user platform is configured as a terminal device that interacts with a user, which receives input information of the user to generate an instruction and sends it to the service platform, and displays information sent by the service platform to the user. The service platform is configured as a first server, which receives the instruction sent by the user platform, processes and sends it to the management platform, and acquires information required by the user from the management platform and sends it to the user platform. The management platform is configured as a second server, which receives the instruction sent by the service platform and controls an operation of the object platform according to the instruction, and receives and stores perception information sent by the object platform. The sensor network platform is configured as a communication network and a gateway for the management platform to interact with the object platform. The object platform is configured as a production line device for performing manufacturing and a production line sensor for performing data collection, which receives the instruction from the management platform to run, and sends the perception information to the management platform through the sensor network platform. The service platform adopts a centralized arrangement, and the centralized arrangement means that a platform receives data uniformly, processes data uniformly, and sends data uniformly. Both the management platform and the sensor network platform adopt a rear sub-platform arrangement, the rear sub-platform arrangement means that the management platform and the sensor network platform are provided with a total platform and a plurality of sub-platforms, and control information and parameter configuration information of the object platform are transmitted from the sub-platform to the total platform, and the perception information is transmitted from the total platform to the sub-platform. When configuring the object platform parameters, the user inputs the parameter configuration information of the object platform through the user platform, and the service platform receives the parameter configuration information of the object platform sent by the user platform and disassembles it into multiple sets of configuration data groups according to process; the management platform stores and processes the received configuration data groups and sends them to the sensor network platform, and the stored configuration data group is used as a reference data group; the sensor network platform stores and processes the received configuration data groups and sends them to the object platform, and the object platform completes a parameter configuration of the object platform according to the parameter configuration information of the object platform; and when the production line device of the object platform is running, the object platform sends the perception information as a verification data group to the management platform through the sensor network platform at a set time interval; the management platform receives and processes the verification data group sent by the object platform, and sends the reference data group and the verification data group corresponding to the object platform that sends the verification data group to the service platform; the service platform receives and compares the reference data group and the verification data group, if comparison between all data in the verification data group and the reference data group are within a set threshold range, the data is cleared and no subsequent processing is performed, if the comparisons between the data in the verification data group and the reference data group exceeds the set threshold range, a stop operation instruction is generated and sent to the management platform and fed back to the user platform, and the management platform sends it to the corresponding object platform through the sensor network platform to control the production line device to stop running.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which same reference numerals represent similar structures throughout the several views of the drawings, and wherein:

FIG. 3 is a flowchart illustrating verifying perception information according to a specific embodiment of the present disclosure;

FIG. 4 is an exemplary flowchart illustrating an intelligent manufacturing method based on Industrial Internet of Things with a centralized service platform according to some embodiments of the present disclosure;

DETAILED DESCRIPTION

Figure 1:
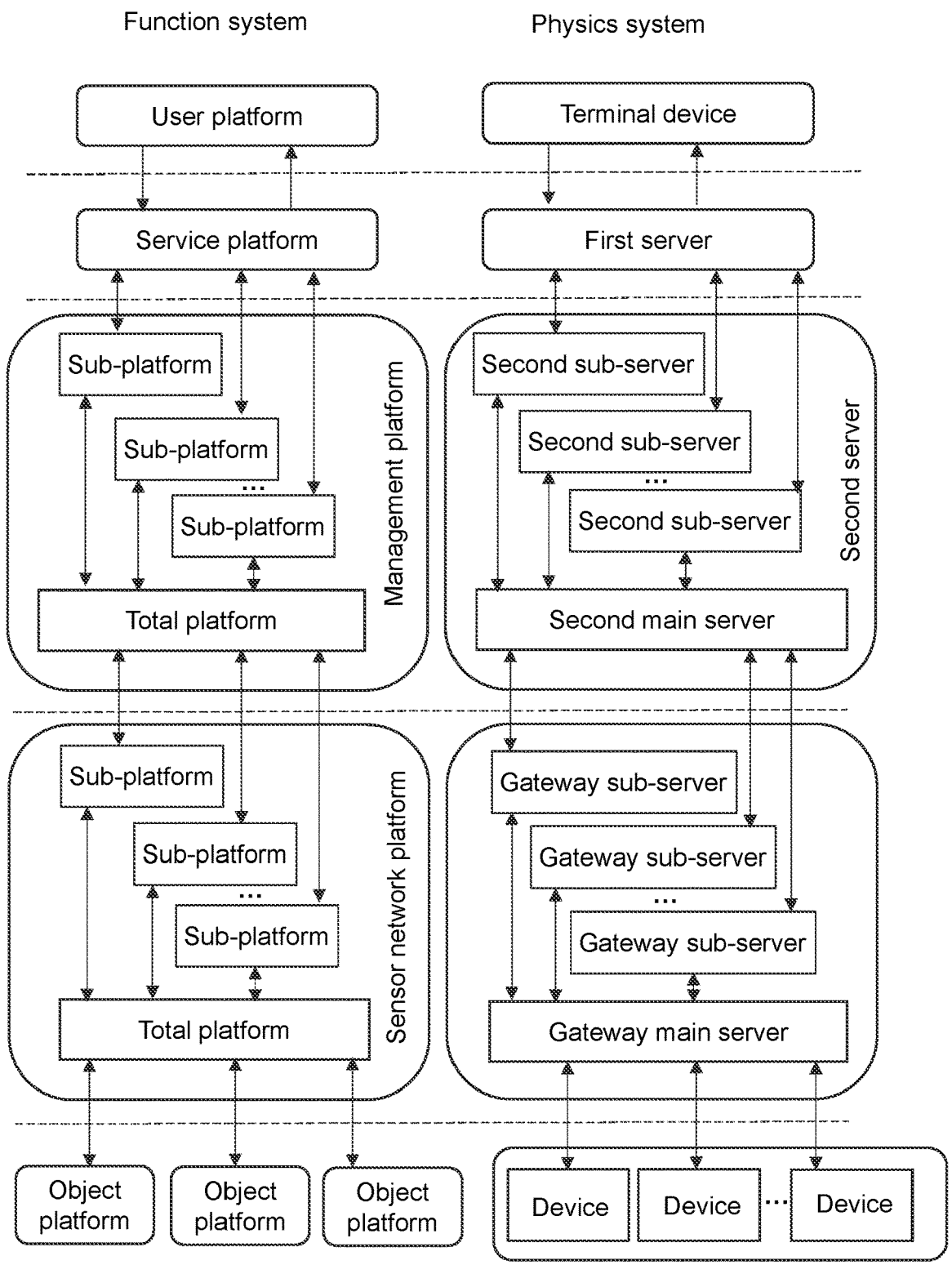
FIG. 1 is a module diagram illustrating an intelligent manufacturing system based on Industrial Internet of Things with a centralized service platform according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a module diagram illustrating an intelligent manufacturing system based on Industrial Internet of Things with a centralized service platform according to some embodiments of the present disclosure. As shown in FIG. 1, a system 100 includes a user platform, a service platform, a management platform, a sensor network platform, and an object platform that interact in sequence. The user platform, the service platform, the management platform, the sensor network platform and the object platform realize interaction through sequential communication and connection.

The user platform is configured as a terminal device that interacts with a user, which receives input information of the user to generate an instruction and sends it to the service platform, and displays information sent by the service platform to the user.

The service platform is configured as a first server, which receives the instruction sent by the user platform, processes it and sends it to the management platform, and acquires information required by the user from the management platform and sends it to the user platform. The service platform judges whether the process is abnormal based on the processed verification data group; and the processed verification data group at least includes a standard score of the production line device executing the process; and in response to judging that the process is abnormal, the service platform sends the stop instruction to the management platform, and the management platform controls the production line device to stop processing the blank.

The management platform is configured as a second server, which receives the instruction sent by the service platform and controls an operation of the object platform according to the instruction, and receives and stores perception information sent by the object platform. The management platform identifies the process, and acquires the verification data group of the corresponding process. The verification data group is the acquired data for verifying whether the process is normally executed. The management platform processes the verification data group through an abnormality judgment model to acquire a processed verification data group.

The sensor network platform is configured as a communication network and a gateway for the management platform to interact with the object platform.

The object platform is configured as a production line device for performing manufacturing and a production line sensor for performing data collection, which receives the instruction from the management platform to run, and sends the perception information to the management platform through the sensor network platform. The production line device may include, but is not limited to, a casting device, a pouring device, a pressing device, or the like. The production line sensor may include, but is not limited to, a temperature sensor, a pressure sensor, a hardness sensor, etc.

When the present embodiment is specifically implemented, the user platform adopts a desktop computer, a tablet computer, a notebook computer, a mobile phone, etc. to realize an intelligent electronic device of data processing and data communication, which is not limited here. The service platform in the present embodiment adopts a centralized arrangement, and the centralized arrangement means that a platform receives data uniformly, processes data uniformly, and sends data uniformly. Both the management platform and the sensor network platform in the present embodiment adopt a rear sub-platform arrangement, the rear sub-platform arrangement means that the management platform and the sensor network platform are provided with a total platform and a plurality of sub-platforms, and control information and parameter configuration information of the object platform are transmitted from the sub-platform to the total platform, and the perception information is transmitted from the total platform to the sub-platform. In an embodiment, the total platform of the management platform is configured as a second main server, and its sub-platform is configured as a second sub-server, the total platform of the management platform receives and processes data based on the second main server, and the sub-platforms of the management platform receive and process data based on the second sub-servers. The total platform of the sensor network platform is configured as a gateway main server, and its sub-platform is configured as a gateway sub-server. The total platform of the sensor network platform receives and processes data based on the gateway main server, and the sub-platforms of the sensor network platform receive and process data based on the gateway sub-servers. The data processing process mentioned in the present embodiment may be processed by the processor of the terminal device and the server, and the server is equipped with a corresponding database for storing data, and the database may be stored on a storage device of the server, such as a hard disk and other memories. The parameter configuration information of the object platform includes production line device running data, production line device operation data, manufacturing process data, and product data such as blank samples, semi-finished products, and finished products corresponding to each stage. The perception information acquired by the object platform includes production line device running data, production line device operation data, manufacturing process data, and data collected by sensors.

When the present embodiment is specifically implemented, the object platform is disassembled into a plurality of object platforms based on different production line devices and production line sensors applied to different processes, and each object platform is provided with corresponding production line device and production line sensor.

The intelligent manufacturing method based on Industrial Internet of Things with a centralized service platform includes the steps of sequentially transmitting control information and parameter configuration information of object platform from the user platform, the service platform, the management platform, the sensor network platform, and the object platform, and sequentially transmitting perception information from the object platform, the sensor network platform, the management platform, the service platform, and the user platform. When the instruction is transmitted, the receiving and processing of the instruction by each server is specifically processed into a data packet format that is easy to identify by a set next level receiving object.

It should be understood that the system and its modules shown in FIG. 1 may be implemented in various ways.

It should be noted that the above description of the intelligent manufacturing system and its modules based on Industrial Internet of Things with a centralized service platform is only for the convenience of description, and does not limit the description to the scope of the illustrated embodiments. It may be understood that for those skilled in the art, after understanding the principle of the system, various modules may be combined arbitrarily, or a sub-system may be formed to connect with other modules without departing from the principle. In some embodiments, the user platform, the service platform, the management platform, the sensor network platform, and the object platform disclosed in FIG. 1 may be different modules in a system, or may be a module that implements two or more of the above-mentioned functions of the module. For example, each module may share one storage module, and each module may also have its own storage module. Such deformations are all within the protection scope of the present disclosure.

Figure 2:
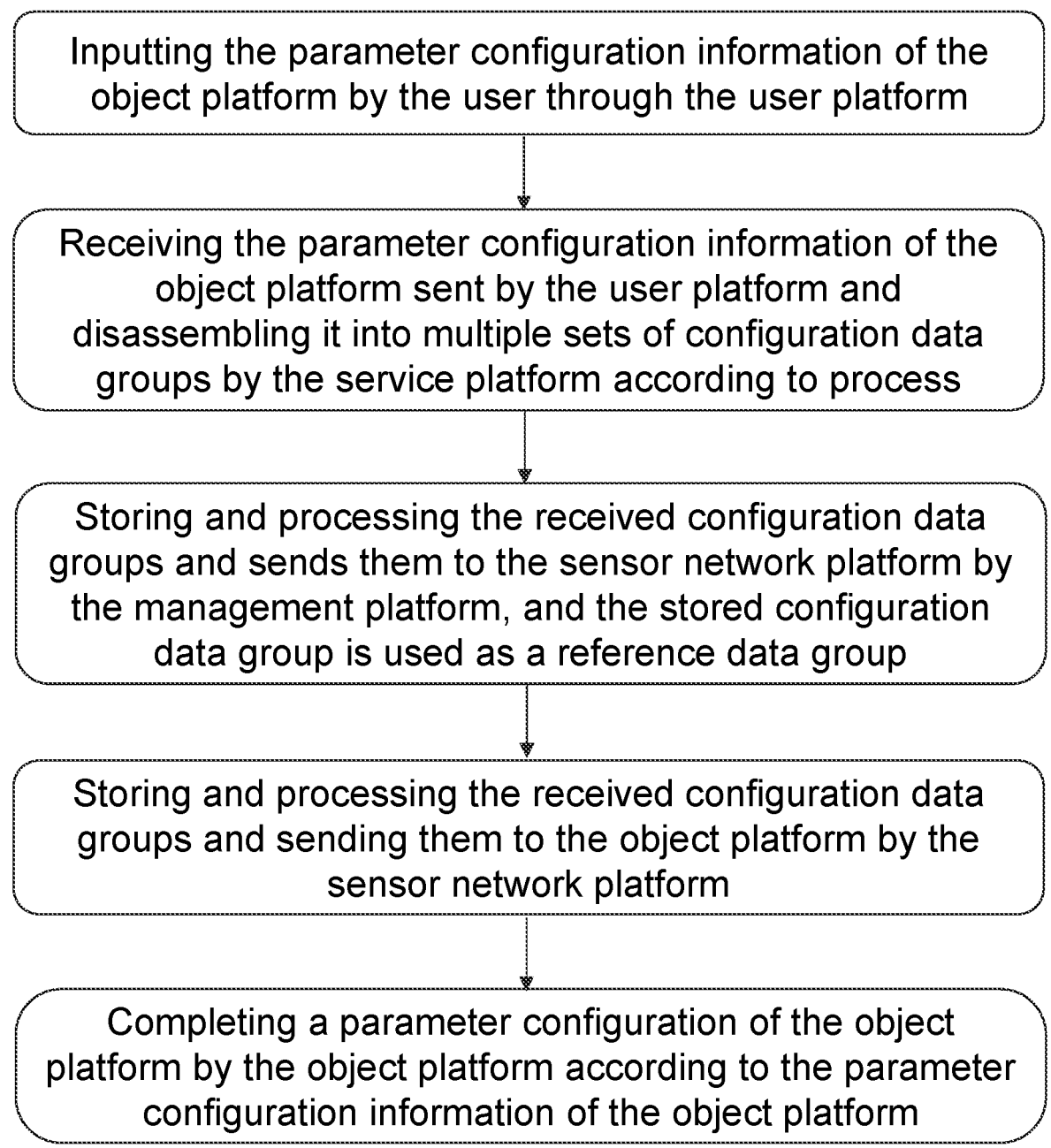
FIG. 2 is a flowchart illustrating a configuration of a parameter of the object platform according to a specific embodiments of the present disclosure.

FIG. 2 is a flowchart illustrating a configuration of a parameter of the object platform according to a specific embodiments of the present disclosure.

As shown in FIG. 2, a process 200 of the intelligent manufacturing method includes following steps. When configuring the object platform parameters, the user inputs the parameter configuration information of the object platform through the user platform, and the service platform receives the parameter configuration information of the object platform sent by the user platform and disassembles it into multiple sets of configuration data groups according to process; the management platform stores and processes the received configuration data groups and sends them to the sensor network platform, and the stored configuration data group is used as a reference data group; the sensor network platform stores and processes the received configuration data groups and sends them to the object platform, and the object platform completes a parameter configuration of the object platform according to the parameter configuration information of the object platform. When the present embodiment is specifically implemented, when the user platform sends the parameter configuration information to the object platform, each sub-platform of the management platform correspondingly stores and processes a set of configuration data group, the total platform of the management platform aggregates the configuration data group of all sub-platforms of the management platform, then stores and processes the configuration data group, and sends the multiple sets of configuration data groups to the sub-platforms of the sensor network platform in a one-to-one correspondence; and each sub-platform of the sensor network platform stores and processes the received configuration data groups, the total platform of the sensor network platform aggregates the configuration data groups processed by all sub-platforms of the sensor network platform, then stores and processes the configuration data groups, and sends the multiple sets of configuration data groups to the object platform in the one-to-one correspondence.

FIG. 3 is a flowchart illustrating verifying perception information according to a specific embodiment of the present disclosure.

As shown in FIG. 3, a process 300 of the intelligent manufacturing method includes following steps. When the production line device of the object platform is running, the object platform sends the perception information as a verification data group to the management platform at a set time interval through the sensor network platform; the management platform receives and processes the verification data group sent by the object platform, and sends the reference data group and the verification data group corresponding to the object platform that sends the verification data group to the service platform; the service platform receives and compares the reference data group and the verification data group, if comparison between all data in the verification data group and the reference data group are within a set threshold range, the data is cleared and no subsequent processing is performed, if the comparisons between the data in the verification data group and the reference data group exceeds the set threshold range, a stop operation instruction is generated and sent to the management platform and fed back to the user platform, and the management platform sends it to the corresponding object platform through the sensor network platform to control the production line device to stop running. The set time interval for the object platform to acquire perception information and the set threshold range for parameter comparison are preset according to user needs.

When the present embodiment is applied, during the operation of the production line device, the operation parameter and the product corresponding to each process are verified in real time, which may quickly avoid an influence of the process deviation on product manufacturing and save resources.

In some embodiments, when the service platform compares the reference data group and the verification data group, if the comparison between the data in the verification data group and the reference data group exceeds the set threshold range, the service platform also actively generates a perception information acquisition instruction and sends it to the management platform before generating the stop operation instruction, and the management platform receives the perception information acquisition instruction sent by the service platform and controls the corresponding object platform to send a current perception information according to the perception information acquisition instruction. The object platform feeds back the current perception information as the validation data group to the management platform through the sensor network platform, the management platform receives and processes the validation data group fed back by the object platform then sends it to the service platform, the service platform receives the validation data group and compares it with the reference data group, if the comparison between all the data in the validation data group and the reference data group are within the set threshold range, the data in the validation data group is cleared and no subsequent processing is performed, only when the comparison between the data in the validation data group and the reference data group exceeds the set threshold range, the service platform generates the stop operation instruction. The service platform actively generates the perception information acquisition instruction and executes it immediately when it is confirmed that the comparison between the data in the verification data group and the reference data group exceeds the set threshold range. The time taken for the instruction to be sent to the object platform is less than the time from the time when the comparison exceeds the set threshold range to the time when the object platform actively sends the perception information next.

When the present embodiment is applied, validation is performed again after verification, so that a wrong operation caused by data transmission deviation may be avoided.

In some embodiment, after the service platform generates the stop operation instruction, the service platform also actively generates the perception information acquisition instruction of a cascading process of a current process and sends it to the management platform, the management platform receives the perception information acquisition instruction sent by the service platform and controls a cascading process object platform of the currently corresponding object platform to send the current perception information according to the perception information acquisition instruction; the cascading process is an upper-level process or a lower-level process of the current process. The cascading process object platform feeds back the current perception information as the verification data group to the management platform through the sensor network platform, the management platform receives the verification data group fed back by the cascading process object platform and processes it, then sends the reference data group and the verification data group corresponding to the cascading process object platform that sends the verification data group to the service platform, the service platform receives the verification data group and the reference data group and compares the two data groups, if the comparisons between all the data in the verification data group and the reference data group are within the set threshold range, the data in the validation data group is cleared and no subsequent processing is performed, if the comparison between the data in the verification data group and the reference data group exceeds the set threshold range, the stop operation instruction is generated and sent to the management platform and fed back to the user platform, and the management platform sends it to the corresponding cascading process object platform through the sensor network platform to control a cascading process production line device to stop running. In the process of intelligent manufacturing, blank manufacturing, parts manufacturing, complete machine assembly, product inspection, etc. are involved, while casting, forging, punching, etc. are involved in specific processing. For the blank, a series of coherent processes are required to acquire a finished product. In the present embodiment, when it is detected that there is a problem in a certain process, the cascading process is checked immediately, so that a quality of the product manufactured by the cascading process may be ensured.

In some embodiments, when the cascading process is the lower-level process of the current process, the service platform also actively generates a cascading process perception information acquisition instruction and sends it to the management platform before generating the stop operation instruction, the management platform receives the cascading process perception information acquisition instruction sent by the service platform and control the corresponding cascading process object platform to send the current perception information according to the cascading process perception information acquisition instruction. The cascading process object platform feeds back the current perception information as the validation data group to the management platform through the sensor network platform, the management platform receives and processes the validation data group fed back by the cascading process object platform and then sends it to the service platform, the service platform receives the validation data group and compares it with the reference data group, if the comparison between all the data in the validation data group and the reference data group are within the set threshold range, the data in the validation data group is cleared and no subsequent processing is performed, only when the comparison between the data in the validation data group and the reference data group exceeds the set threshold range, the service platform generates the stop operation instruction to control the cascading process production line device to stop running. For products that are processed sequentially through processes, the product operated by a subsequent process is further processed on the product manufactured by a previous process. When there is a problem with the previous process of the current process, the processed product may also have problems. In the present embodiment, when there is a problem in the current process, the next level cascading process is validated again when there is no problem in the preliminary verification of the lower-level cascading process, thereby ensuring the quality of the processed product.

In some embodiments, the service platform disassembles the parameter configuration information into multiple sets of configuration data groups according to the process, then the service platform also establishes a product model of a corresponding process according to the data in each configuration data group and sends it to the user platform, the user sends a confirmation instruction to the service platform after confirming that the product model is correct through the user platform, and the service platform receives the confirmation instruction and processes it, and then sends the confirmed configuration data group to the management platform. The service platform of the present embodiment establishes the product model of a corresponding process according to the data in each set of configuration data group, which may be specifically implemented based on existing modeling software such as Solidworks, UG, and 3DS Max. In the present embodiment, the product model is established for the user to confirm, so that the user may correct the deviation of the input product parameters in time, thereby preventing the correct operation of the system from being affected by errors of the reference data during subsequent verification and validation.

In some embodiments, the service platform pre-stores pre-stored information of conventional local design of products, before the service platform disassembles the parameter configuration information of the object platform into multiple sets of configuration data groups according to the process, the service platform also screens out conventional local design information in the parameter configuration information of the object platform, and compares it with the pre-stored information of the conventional local design of the products, if all the comparison results are within a set design deviation threshold range, the service platform performs a disassembly processing, if the comparison result exceeds the set design deviation threshold range, it may be sent to the user platform; if the user confirms that the input information is correct through the user platform, the user sends the confirmation instruction to the service platform, the service platform performs the disassembly processing again, if the user modifies the input information through the user platform, the service platform compares again, and the service platform may perform the disassembly processing again until the user platform confirms it. In this way, when the present embodiment is applied, it may provide a comparison of the conventional design data of the product, and provide a checking function for the user when inputting data in the early stage, which may improve an intelligent performance of the system.

In some embodiments, when the object platform sends the perception information as the verification data group to the management platform through the sensor network platform at the set time interval, different object platforms send the perception information in a staggered manner. In this way, the present embodiment may reduce the workload of the first server, the second main server, and the gateway main server at the same time, thereby effectively improving work efficiency.

In some embodiments, multiple object platforms corresponding to each process are set, when the production line device of one of the object platforms stops running, the service platform checks production condition information of the object platform with the same process as the object platform, and allocates a production amount of object platform with the same process as the object platform according to a production demand. In the intelligent manufacturing process, a production plan is often formulated according to the quantity of products required by the customer. In the present embodiment, a coordinated processing may ensure that the production amount meets the expected requirement. When the present embodiment is specifically implemented, when the production line device with problems is confirmed to be able to continue to be put into production after debugging, the processing amount of the object platform corresponding to each process may be adjusted again to ensure efficient production.

FIG. 4 is an exemplary flowchart illustrating an intelligent manufacturing method based on Industrial Internet of Things with a centralized service platform according to some embodiments of the present disclosure.

In some embodiments, the intelligent manufacturing method may be a method for processing a blank, the method for processing the blank includes a variety of processes, and the process for processing the blank may at least include casting, forging and/or punching etc.

In some embodiments, the system 100 executes a process 400 when the production line device of the object platform is running the process of producing the blank. The production line device may include at least a forging device, a pressing device and/or a punch, or the like. For more descriptions about the object platform and production line device, please refer to FIG. 1 and its associated descriptions. As shown in FIG. 4, the process 400 includes the following steps.

Step 410, the management platform identifies the process, and acquires the verification data group of the corresponding process.

In some embodiments, the object platform may be disassembled into multiple types by the process, and the management platform may identify the process according to the type of the object platform. For example, if the type of the object platform A is a casting object platform, the management platform may identify the process acquired from the object platform A as the process of the casting blank, and use the perception information received from the object platform A as the verification data group of the casting blank. The casting object platform refers to the object platform for casting the blank. For more information about disassembling the object platform, please refer to FIG. 2 and its associated descriptions. For more information about the management platform, please refer to FIG. 1 and its associated descriptions.

The verification data group may be various acquired data for verifying whether the process is normally executed. In some embodiments, the verification data group may be perception information. For example, the process may be casting the blank, and the step of casting the blank may include at least a metal smelting. The verification data group may include running data and operation data of the smelting device, process data of the metal smelting, temperature information of the metal acquired by the temperature sensor, or the like. For more information about perception information, please refer to FIG. 1 and its associated descriptions.

Step 420, the management platform processes the verification data group through an abnormality judgment model to acquire a processed verification data group.

In some embodiments, the abnormality judgment model is set in the management platform, and the abnormality judgment model may be used to process the verification data group to acquire the processed verification data group. In some embodiments, the abnormality judgment model may be various machine learning models, including but not limited to random forests, logistic regression, support vector machines, or the like.

In some embodiments, there may be multiple abnormality judgment models, and different abnormality judgment models may be set in sub-platforms of different management platforms to process different types of verification data groups.

In some embodiments, the management platform may input the reference data group and the verification data group into the abnormality judgment model, and the model outputs a standard score of the verification data group. The reference data group may be various data representing the normal execution of the process. For example, the reference data group may include, but is not limited to, the running data and operation data of the normal operation of the production line device, standard process data of the processed blank, the data of the normal operation of the production line device acquired by the sensor, or the like. Types of reference data may include, but are not limited to, numerical ranges, images of standard processes, or the like. For more information about the reference data set, please refer to FIG. 2 and its associated descriptions. For more contents of the abnormality judgment model, please refer to FIG. 5, FIG. 6, and FIG. 7 and their related descriptions.

Step 430, the service platform judges whether the process is abnormal based on the processed verification data group.

The processed verification data group at least includes a standard score of the production line device executing the process. The standard score may be used to indicate standard degree of the process performed by the production line device. For example, a higher score indicates a higher standard degree, a lower score indicates a lower standard degree, and when the score is lower than the set threshold range, it may be determined that there is an abnormality in the process. The set threshold range may be the range of the standard score when the production line device is working normally. In some embodiments, the set threshold range may be set by the user through the user platform and sent to the service platform. In some embodiments, the set threshold ranges corresponding to different processes may be different, which may be set according to experience.

In some embodiments, the service platform may compare the acquired standard score with the set threshold range, and if the standard score is not within the set threshold range, it means that there is an abnormality in the corresponding process.

Step 440, in response to judging that the process is abnormal, the service platform sends the stop instruction to the management platform, and the management platform controls the production line device to stop processing the blank.

In some embodiments, when it is determined that there is an abnormality in the process, the service platform generates an instruction for stopping processing the blank to the management platform and feeds it back to the user platform. The management platform receives the stop instruction sent by the service platform, and controls the corresponding object platform to stop running.

Figure 5:
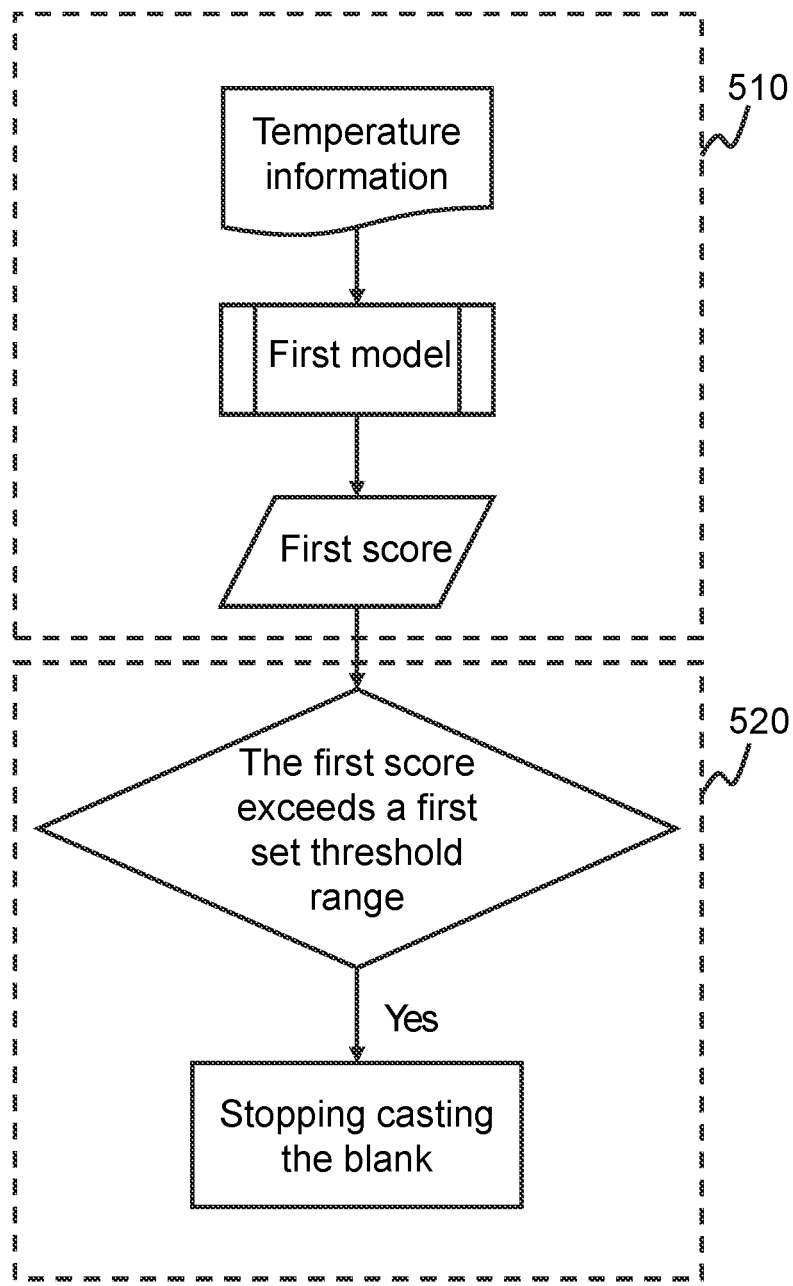
FIG. 5 is an exemplary diagram illustrating an intelligent manufacturing method based on Industrial Internet of Things with a centralized service platform for casting a blank according to some embodiments of the present disclosure.

FIG. 5 is an exemplary diagram illustrating an intelligent manufacturing method based on Industrial Internet of Things with a centralized service platform for casting a blank according to some embodiments of the present disclosure.

In some embodiments, when the production line device casts the blank, the abnormality judgment model is a first model; the verification data group includes temperature information. As shown in FIG. 5, a process 500 includes the following steps.

Step 510, the management platform inputs the temperature information into the first model, the first model outputs a first score.

The step of casting may at least include metal smelting, and pouring the smelted metal into a casting mould to acquire a casting part. The casting mould may refer to a mold into which smelted metal is poured during casting to form the casting part. The temperature information may be temperature-related information generated in the process of casting the blank. In some embodiments, the temperature information may be divided into smelting temperature information and pouring temperature information according to the step of casting.

The smelting temperature information may refer to temperature information in the process of smelting metal. For example, the smelting temperature information may include temperature information of the smelted metal acquired at a first set time interval during the smelting process.

The first set time interval may refer to a preset time interval for acquiring the smelting temperature information. The first set time interval may be set according to experience.

The pouring temperature information may refer to the temperature information in the process of pouring the smelted metal into the mold to acquire the casting part. For example, the pouring temperature information includes temperature information of the casting part acquired at a second set time interval after pouring.

The second set time interval may refer to a preset time interval for acquiring the pouring temperature information. The second set time interval may be set according to experience.

Due to the influence of temperature on the hardness of metal, the deformation caused by forging the casting part at different temperatures is different. In some embodiments, to avoid serious deformation of the casting part during forging to form waste products, the temperature information of the casting part may include temperature distributions of the casting part at multiple locations, for example, temperature values at a top, middle, and bottom of the casting part. When the temperature values of the casting part at multiple locations are at temperatures suitable for forging, the casting part is forged.

In some embodiments, the temperature information may be acquired in various feasible ways.

The first score may be used to indicate a standard degree of the casting device performing the casting process. In some embodiments, the first score may be represented by a numerical value, and a higher numerical value indicates a higher standard degree of the casting process, and vice versa.

In some embodiments, the first score may be determined using the first model. In some embodiments, the first model may include a trained machine learning model, which may include various models and results, for example, a deep learning model (DNN), a recurrent neural network (RNN), or the like.

In some embodiments, the input to the first model includes temperature information and the output of the first model is the first score. For example, the input temperature information may be a melting temperature value and a pouring temperature value at each time point; the first model extracts the temperature values of different temperature information at each time point respectively, and acquires the change features of the melting temperature value and the change features of the pouring temperature value; the first model outputs the first score of the casting blank. The input of the first model may also include other temperature information, and the output thereof and the determination of the first score may also adopt other feasible methods.

In some embodiments, a method for acquiring the first model includes acquiring at least one first training sample and an initial first model, the first training sample includes sample temperature information marked with a score; and the parameters of the initial first model are iteratively updated to acquire the first model based on the at least one first training sample. For example, multiple labeled training samples may be input into the initial first model, a loss function may be constructed based on the labels and the prediction results of the initial first model, and the parameters of the initial first model may be iteratively updated based on the loss function. Model training is completed when the loss function satisfies a preset condition, where the preset condition may be that the loss function converges, the number of iterations reaches a threshold, or the like. The method of training the initial first model may be various common methods, such as gradient descent method, or the like.

Step 520, if the first score exceeds a first set threshold range, the service platform determines that the casting process is abnormal and controls the production line device to stop casting the blank.

The first set threshold range may refer to a preset range of the first score. When the first score is within the preset range, the possibility of abnormality in the casting process is low, and it may be considered that there is no abnormality in the casting process.

In some embodiments, the first set threshold range may be set by experience. For example, experience has shown that when the first score is lower than 3, the probability of abnormality in the casting process is close to 100%. Therefore, the first set threshold range may be determined to be a range greater than 3.

In some embodiments of the present disclosure, by monitoring the temperature of the casting blank in the whole process, and using the first model to judge whether the casting process is abnormal, it may ensure that the process of casting the blank may be carried out more safely and orderly.

Figure 6:
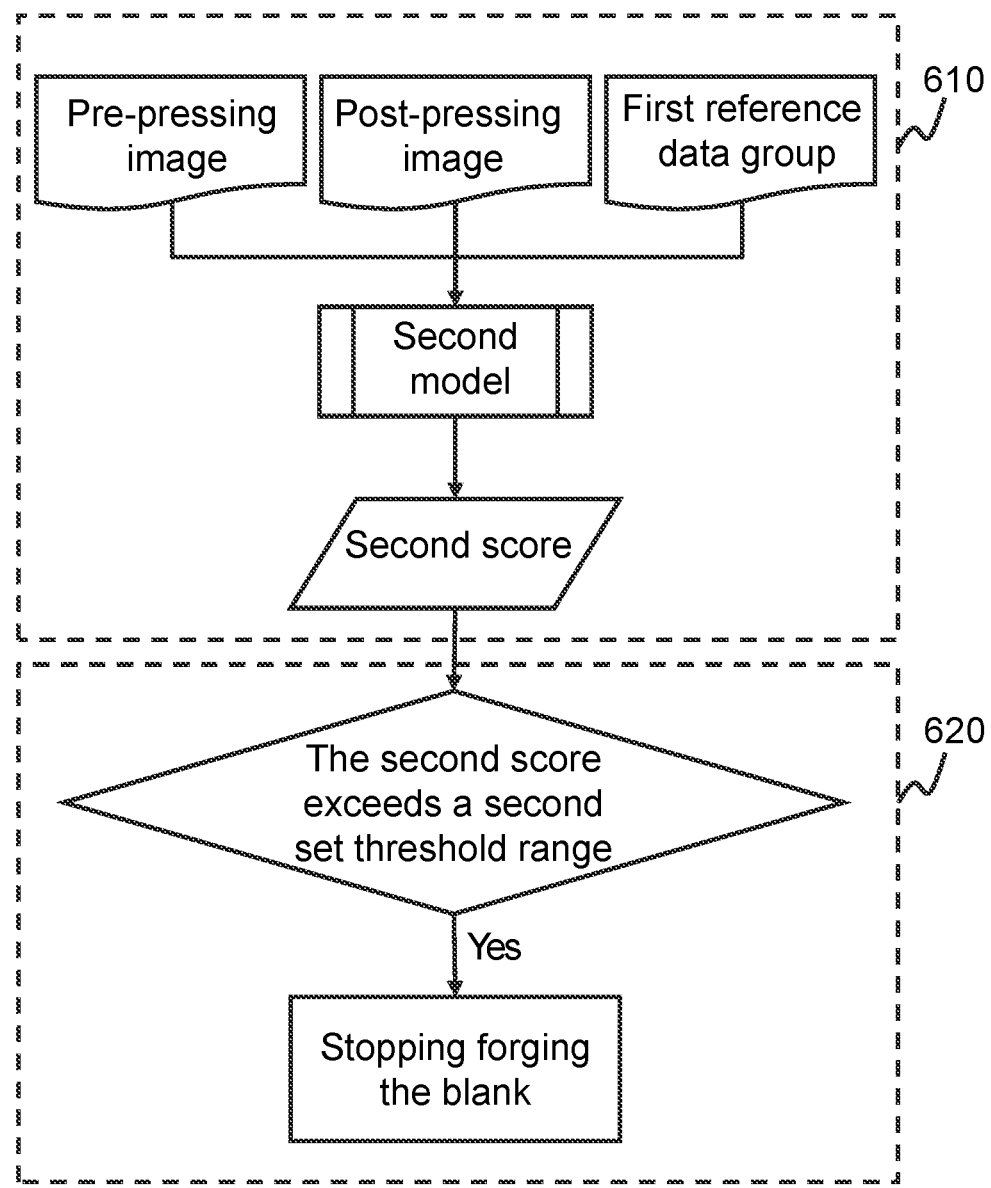
FIG. 6 is an exemplary diagram illustrating an intelligent manufacturing method based on Industrial Internet of Things with a centralized service platform for forging a blank according to some embodiments of the present disclosure.

FIG. 6 is an exemplary diagram illustrating an intelligent manufacturing method based on Industrial Internet of Things with a centralized service platform for forging a blank according to some embodiments of the present disclosure.

In some embodiments, when the production line device forges the blank, the abnormality judgment model is a second model; and the verification data group includes a pre-pressing image and a post-pressing image of forging the blank. As shown in FIG. 6, a process 600 includes the following steps.

Step 610, the management platform inputs the pre-pressing image, the post-pressing image, and a first reference data group into the second model, the second model outputs a second score.

The pre-pressing image may refer to an image before pressing the blank. For example, the image of the casting part, the image of the blank before each pressing, etc. The pre-pressing image may be used to represent a form of the blank before being pressed.

The post-pressing image may refer to an image after pressing the blank. For example, an image of the blank after each pressing. The post-pressing image may be used to represent a form of the blank after being pressed.

In some embodiments, the pre-pressing image and the post-pressing image of the blank may be acquired by various image acquisition devices.

The first reference data group may refer to standard data for judging whether the blank forging is standard. In some embodiments, the first reference data group includes a standard pre-pressing image and a standard post-pressing image.

The standard pre-pressing image may be a preset standard form of the pre-pressing blank. For example, the standard pre-pressing image may be an image of a product model before forging. In some embodiments, the standard pre-pressing image includes a standard form before forging the blank. For example, the size of the casting part, the flatness of the casting part, etc.

The standard post-pressing image may be a preset standard form of the post-pressing blank. For example, the standard post-pressing image may be an image of a product model after forging. In some embodiments, the standard post-pressing image includes a standard form after forging the blank. For example, the size of the forging part, the flatness of the forging part, etc.

The second score may be used to indicate a standard degree of the forging device performing the forging process. The representation of the second score is similar to that of the first score. For more contents of the second score, please refer to FIG. 5 and its related descriptions.

In some embodiments, the second score may be determined using the second model. In some embodiments, the second model may include a trained machine learning model, which may include various models and results, for example, a deep neural network (DNN), a convolutional neural network (CNN), or the like.

In some embodiments, the input of the second model may be an image pair, the image pair may include a pre-forging image and a standard pre-pressing image and a post-forging image and a standard post-pressing image, and the output of the second model may be the second score of the forging blank. For example, image a is an image of casting part A, image d is an image of forging part A; image a1 is an image of the product model before forging (i.e., an image of a standard casting part), and image b1 is an image of the product model after forging (i.e., an image of a standard forging part). The forging part A may be acquired by forging the casting part A. Therefore, the input of the second model may be {(a, a1), (d, b1)}; the second model may extract the features of the input image respectively, and then compare the features of a and a1, d and b1 respectively, and the second score is acquired based on the comparison result.

In some embodiments, the verification data group includes a sequence of images in which the blank is pressed multiple times. The standard pre-pressing image is a standard image of the blank before being pressed. The standard post-pressing image is a standard image of the blank after being pressed for a last time.

The images pressed multiple times may come from the forging process of the same blank, and sequence of the images pressed multiple times may be acquired by sorting the images pressed multiple times according to a forging order. For example, forging part A is acquired by pressing casting part A three times, and image a is acquired before pressing casting part A; image b is acquired after pressing casting part A for the first time; images c and d are acquired after the second and third pressing in the same way as image b is acquired. The sequence of images in which the forging part A is pressed multiple times may be acquired: (a, b, c, d).

When the blank is forged, an intermediate shape of the blank formed during the forging process is not uniform. Therefore, the standard image before pressing the blank may be used as the standard pre-pressing image, and the standard image after pressing the blank for a last time may be used as the standard post-pressing image. For example, the standard pre-pressing image may be the standard image of the casting. The standard post-pressing image may be the standard image of the forging part.

In some embodiments, the second model may be a spatiotemporal network model (CNN+LSTM). In some embodiments, the input of the second model may include the sequence of images pressed multiple times, the standard pre-pressing image, and the standard post-pressing image, and the output of the second model may be the second score of the forging process. For example, the sequence of image pressed multiple times of forging part A is (a, b, c, d), the standard pre-pressing image is a1, and the standard post-pressing image is b1; the input of the second model may be {(a, a1), ((a, b, c, d), b1)}; the second model may acquire the feature e of forging part A based on the sequence of image pressed multiple times, and then compare the features of a and a1 and the features of e and b1, and acquire the second score based on the comparison result.

In some embodiments of the present disclosure, the features of the forging part are acquired based on the sequence of image pressed multiple times, so that the features of the forging part include forging process information, thereby improving the accuracy of the second score.

In some embodiments, a method for acquiring the second model includes: acquiring at least one second training sample and an initial second model, the second training sample includes a second image sample group marked with a score, and the second image sample group includes at least a sample pre-pressing image, a sample post-pressing image, the standard pre-pressing image, and the standard post-pressing image. Based on at least one second training sample, the parameters of the initial second model are iteratively updated to acquire the second model. For example, multiple labeled training samples may be input into the initial second model, a loss function may be constructed based on the labels and the prediction results of the initial second model, and the parameters of the initial second model may be updated based on the iteration of the loss function. The training of the model is completed when the loss function satisfies a preset condition, where the preset condition may be that the loss function converges, the number of iterations reaches a threshold, or the like. The method of training the initial second model may be various common methods, such as gradient descent method, or the like.

Step 620, if the second score exceeds a second set threshold range, the service platform determines that the forging process is abnormal and controls the production line device to stop forging the blank.

The second set threshold range may refer to a preset range of the second score. When the second score is within the preset range, the possibility of abnormality in the forging process is low, and it may be considered that there is no abnormality in the forging process.

In some embodiments, the manner of acquiring the second set threshold range is similar to the manner of acquiring the first set threshold range. For more contents of the second set threshold range, please refer to FIG. 5 and its related descriptions.

In some embodiments of the present disclosure, by monitoring the forging blank and using the second model to judge whether the forging process is abnormal, the situation of the forging blank may be acquired in time, and the abnormal situation may be handled in time, to avoid greater losses caused by untimely processing.

Figure 7:
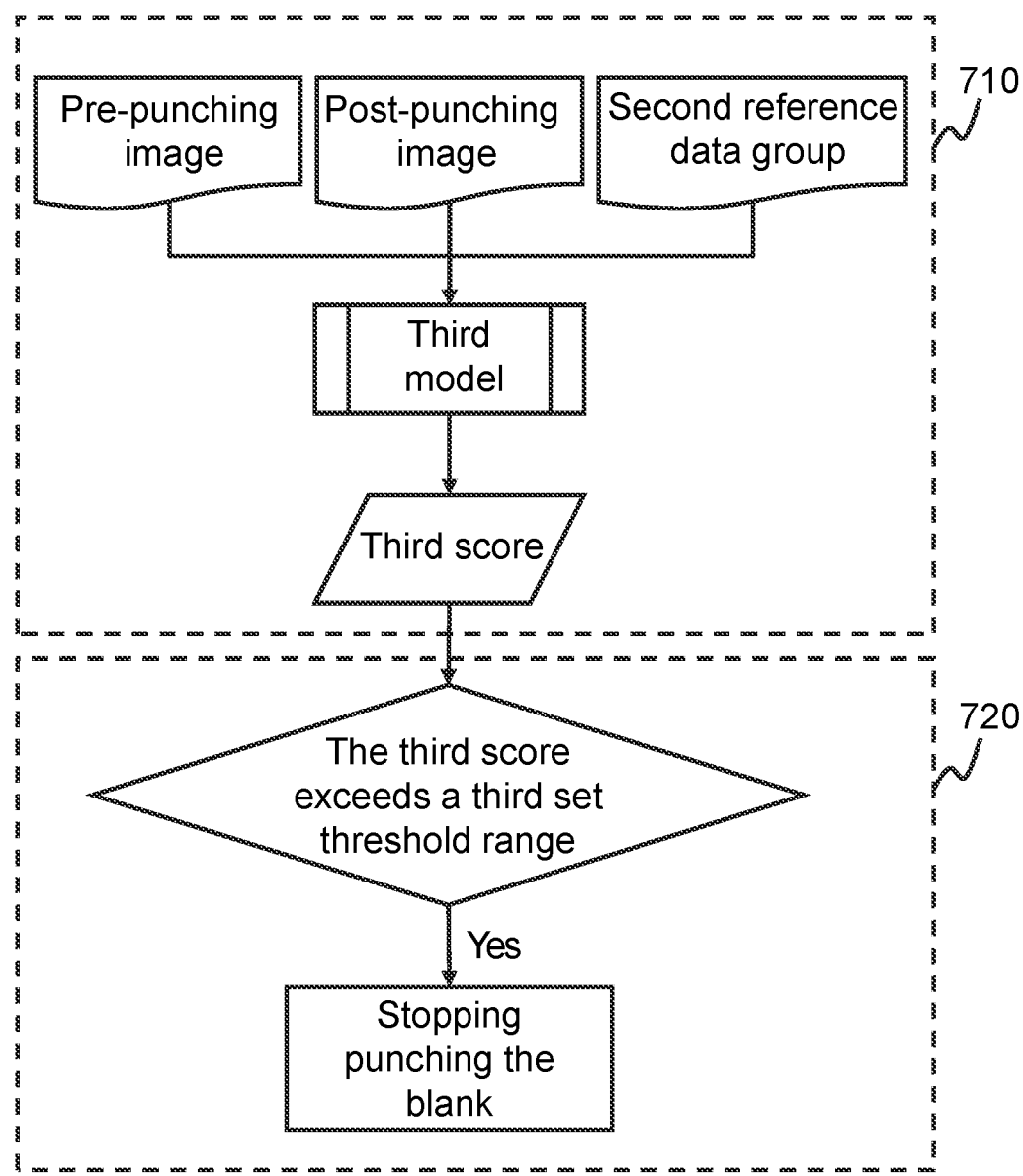
FIG. 7 is an exemplary diagram illustrating an intelligent manufacturing method based on Industrial Internet of Things with a centralized service platform for punching a blank according to some embodiments of the present disclosure.

FIG. 7 is an exemplary diagram illustrating an intelligent manufacturing method based on Industrial Internet of Things with a centralized service platform for punching a blank according to some embodiments of the present disclosure.

In some embodiments, when the production line device punches the blank, the abnormality judgment model is a third model; and the verification data group includes a pre-punching image and a post-punching image of punching the blank. As shown in FIG. 7, a process 700 includes the following steps.

Step 710, the management platform inputs the pre-punching image, the post-punching image, and a second reference data group into the third model, and the third model outputs a third score.

The pre-punching image may refer to the image before punching the blank. For example, images of forging part, images of blanks before each punching, etc. The pre-punching image may be used to represent the shape of the blank before it is punched.

The post-punching image may refer to the image after punching the blank. For example, images of blanks after each punching. The post-punching image may be used to represent the shape of the blank after it is punched.

In some embodiments, the pre-punching image and the post-punching image are acquired in a manner similar to the manner in which the pre-pressing image and the post-pressing image are acquired. For more information about acquiring the pre-punching image and the post-punching image, refer to FIG. 6 and its related description.

The second reference data group may refer to standard data for judging whether the blank punching is standard. In some embodiments, the second reference data group includes a standard pre-punching image and a standard post-punching image.

The standard pre-punching image may be a preset standard form of the pre-punching blank. For example, the standard pre-punching image may be an image of a product model before punching. In some embodiments, the standard pre-punching image includes a standard form before punching the blank. For example, the size of the forging part, the thickness of the forging part, etc.

The standard post-punching image may be a preset standard form of the post-punching blank. For example, the standard post-punching image may be an image of a product model after punching. In some embodiments, the standard post-punching image includes a standard form after punching the blank. For example, the size of the punching part, the thickness of the punching part, etc.

The third score may be used to indicate a standard degree of the punching device performing the punching process. The representation of the third score is similar to that of the first score. For more contents of the third score, please refer to FIG. 5 and its related descriptions.

In some embodiments, the third score may be determined using a third model. The type of the third model and the manner in which the third model determines the third score are similar to those of the second model. For more contents of the third model, refer to FIG. 6 and related descriptions.

In some embodiments, the verification data group includes a sequence of images of the blank punched multiple times. The standard pre-punching image is a standard image of the blank before it is punched. The standard post-punching image is a standard image of the blank after it is punched for a last time. The standard image includes the standard form of the blank.

The images punched multiple times may come from the punching process of the same blank, and a sequence of the images punched multiple times may be acquired by sorting the images punched multiple times according to a punching order. The punching process is similar to the forging process. For more information about the sequence of the images punched multiple times, refer to FIG. 6 and its related descriptions.

For the same reason as the forging blank, the standard image before punching the blank may be used as the standard pre-punching image, and the standard image after punching the blank for a last time may be used as the standard post-punching image. For example, the standard pre-punching image may be the standard image of the forging part. The standard post-punching image may be the standard image of the punching part.

In some embodiments, the input of the third model may include the sequence of images punched multiple times, the standard pre-punching image, and the standard post-punching image, and the output of the third model may be the third score of the punching process. The contents that the third model acquires the third score based on the sequence of images punched multiple times, the standard pre-punching image, and the standard post-punching image are similar to the contents that the second model acquires the second score based on the sequence of images pressed multiple times, the standard pre-pressing image, and the standard post-pressing image. For more information about the third model, please refer to FIG. 6 and its associated descriptions.

In some embodiments of the present disclosure, the features of the punching part are acquired based on the sequence of image punched multiple times, so that the features of the punching part include punching process information, thereby improving the accuracy of the third score.

In some embodiments, a method for acquiring the third model includes: acquiring at least one third training sample and an initial third model, the third training sample includes a third image sample group marked with a score, and the third image sample group includes at least a sample pre-punching image, a sample post-punching image, the standard pre-punching image, and the standard post-punching image. Based on at least one third training sample, the parameters of the initial third model are iteratively updated to acquire the third model. The method of training the third model is similar to the method of training the second model. For more contents of the third model, please refer to FIG. 6 and its related descriptions.

Step 720, if the third score exceeds a third set threshold range, the service platform determines that the punching process is abnormal and controls the production line device to stop punching the blank.

The third set threshold range may refer to a preset range of the third score. When the third score is within the preset range, the possibility of abnormality in the punching process is low, and it may be considered that there is no abnormality in the punching process.

In some embodiments, the manner of acquiring the third set threshold range is similar to the manner of acquiring the first set threshold range. For more contents of the third set threshold range, please refer to FIG. 5 and its related descriptions.

In some embodiments of the present disclosure, by monitoring the punching blank and using the third model to judge whether the punching process is abnormal, the situation of the punching blank may be acquired in time, and the abnormal situation may be handled in time, to avoid greater losses caused by untimely processing.

Figure 8:
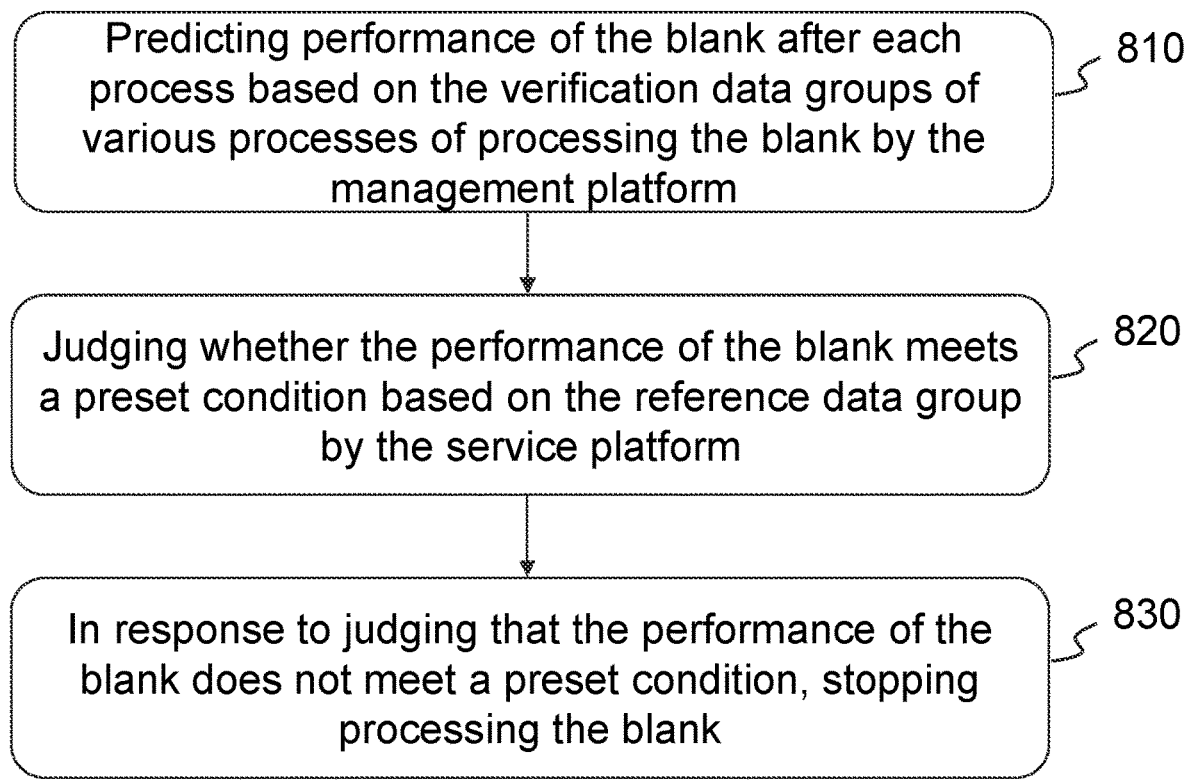
FIG. 8 is an exemplary flowchart illustrating a method for intelligently manufacturing a blank based on performance of the blank according to some embodiments of the present disclosure.

FIG. 8 is an exemplary flowchart illustrating a method for intelligently manufacturing a blank based on performance of the blank according to some embodiments of the present disclosure. As shown in FIG. 8, a process 800 includes the following steps.

Step 810, the management platform predicts performance of the blank after each process based on the verification data groups of various processes of processing the blank.

The performance of the blank may include, but are not limited to, the hardness, the strength, etc. of the blank.

In some embodiments, the management platform may input the verification data group into performance prediction model, and the performance prediction model outputs the performance of the blank. For example, the management platform may input the verification data group of the punching blank into the performance prediction model, and the performance prediction model outputs a predicted hardness of the blank after punching.

In some embodiments, the performance prediction model may be acquired by training an initial performance prediction model through a fourth training sample. The fourth training sample includes a sample verification data group. The sample verification data group is marked with the performance of the corresponding blank. The fourth training sample may be acquired by extracting the historical data of the processing blank. The way of training the performance prediction model is similar to that of training the first model. For more information about training the performance prediction model, please refer to FIG. 4 and its related descriptions.

In some embodiments, the management platform predicts the performance of the blank after each process by fitting the verification data group and historical statistical data.

The historical statistical data may be data acquired after statistical processing of the historical data of the processing blank. The historical statistical data may include the verification data group of the historically processed blank and the performance of the blank processed by the production line device according to the verification data group.

In some embodiments, the management platform may classify the historical statistical data; acquire the historical statistical data of the same type as the verification data group and the verification data group, and use the least squares method to fit the relationship between the verification data group and the historical statistical data, and then calculate the blank performance of the verification data group according to the performance of the blank corresponding to the historical statistical data.

In some embodiments, the management platform may further adjust and modify the fitted performance of the blank according to the actual performance of the blank, and save the adjusted and modified data. By continuously recording the actual performance of the blank and the predicted performance of the blank, it may achieve a better fit effect.

In some embodiments of the present disclosure, the performance of the blank is predicted by fitting the verification data group and historical statistical data, so that the predicted performance of the blank is more accurate.

Step 820, the service platform judges whether the performance of the blank meets a preset condition based on the reference data group.

In some embodiments, the reference data group includes standard data for the process. For example, the reference data group includes the performance that the blank should achieve after the respective operation. For more information about the reference data group, please refer to FIG. 4 and its associated descriptions.

The preset condition may refer to the condition that the performance of the processed blank should satisfy. In some embodiments, the service platform may determine the standard value range of various performance of the blank after the process according to the data of the reference data group. In some embodiments, the service platform may determine whether the performance of the blank after each process meets the standard according to the reference data group, and if it does not meet the standard, it means that there is the abnormality in the processing process.

Step 830, in response to judging that the performance of the blank does not meet a preset condition, processing the blank is stopped. For more information about stopping processing, please refer to FIG. 4 and its associated descriptions.

In some embodiments, the service platform may determine whether there is an abnormal risk in the process of processing the blank based on the score of each operation. If there is an abnormal risk in the process of processing the blank, an actual detection is performed on the performance with a score not up to standard to determine whether there is really an abnormal risk. If there is really an abnormal risk, a stop instruction is sent to the production device whose performance is not up to standard.

The abnormal risk may refer to the risk of abnormality occurring in the process of processing the blank. The abnormal risk may be expressed by high or low.

In some embodiments, the service platform may determine whether there is the abnormal risk in the process of processing the blank based on the first score, the second score, and the third score. For example, the service platform may determine whether the first score, the second score, and the third score are all within the corresponding set threshold range. If the first score, the second score, and the third score are all within the corresponding set threshold range, it is determined that there is no risk in the process of processing the blank. If the first score, the second score, or the third score are not within the corresponding set threshold range, the actual detection is performed on performance with a score not up to the standard.

The actual detection may be to detect the operation of the object platform. For example, a detection device may be set on the object platform, and the detection device may be used to detect the object platform with the abnormal risk. When the service platform determines that there is the abnormal risk in the process of processing the blank, the service platform actively sends an instruction for acquiring a detection verification data group to the management platform. The management platform acquires the detection verification data group from the detection device according to the acquiring instruction; the service platform acquires the data from the management platform to determine whether there is the abnormal risk in the process of processing the blank on the object platform. When the actual detection still indicates that the object platform has the abnormal risk, it is determined that the abnormal risk is true, and the management platform controls the object platform to stop processing the blank. The manner in which the service platform determines whether the detection verification data group is abnormal is similar to the method for judging whether the verification data group is abnormal. For more information about judging whether the detection verification data group is abnormal, please refer to FIG. 4 and related descriptions.

In some embodiments, the service platform may fuse the scores of each process, compare the fusion score with a threshold, and determine whether there is the abnormal risk based on the comparison result. The fusion includes a weight fusion based on each score. For example, the service platform may at least perform fusion processing on the first score, the second score, and the third score by using an arithmetic average method and a weighted average method to acquire a fusion score. In some embodiments, the service platform may determine a credibility of each score, and determine the weight of each score during fusion based on the credibility. In some embodiments, the credibility may be determined according to the accuracy of the abnormality judgment model during training. For example, the weight may be an accuracy rate of the abnormality judgment model, and the accuracy rate may be a ratio of the amount of correctly predicted training samples to the total amount of training samples. For another example, the weight may be a F value of the abnormality judgment model, and the F value is a harmonic value of a precision rate and a recall rate. The F value may be acquired by equation (1):

$$\frac{2}{F1} = \frac{1}{\text{precision rate}} + \frac{1}{\text{recall rate}}, \quad (1)$$

where F1 denotes the F value; the precision rate is the ratio of the amount of correctly predicted positive samples to the total amount of predicted positive samples; the recall rate is the ratio of the amount of correctly predicted positive samples to the total amount of actual positive samples.

In some embodiments of the present disclosure, by detecting the object platform with the abnormal risk again, the number of false detections may be reduced, and the reliability of the system may be improved.

Since the final purpose of processing the blank is that the blank may be used, in some embodiments of the present disclosure, determining whether the process is abnormal based on the performance of the blank may more directly determine whether the processed blank may be used normally, which makes the prediction result more realistic.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An intelligent manufacturing method based on Industrial Internet of Things with a centralized service platform, comprising a user platform, a service platform, a management platform, a sensor network platform, and an object platform that interact in sequence; wherein the user platform is configured as a terminal device that interacts with a user, which receives input information of the user to generate an instruction and sends it to the service platform, and displays information sent by the service platform to the user, wherein the user platform is a desktop computer, a tablet computer, a notebook computer, or a mobile phone;

the service platform is configured as a first server, which receives the instruction sent by the user platform, processes it and sends it to the management platform, and acquires information required by the user from the management platform and sends it to the user platform;

the management platform is configured as a second server, which receives the instruction sent by the service platform and controls an operation of the object platform according to the instruction, and receives and stores perception information sent by the object platform;

the sensor network platform is configured as a communication network and a gateway for the management platform to interact with the object platform;

the object platform is configured as a production line device for performing manufacturing and a production line sensor for performing data collection, which receives the instruction from the management platform to run, and sends the perception information to the management platform through the sensor network platform;

the service platform adopts a centralized arrangement, and the centralized arrangement means that a platform receives data uniformly, processes data uniformly, and sends data uniformly; both the management platform and the sensor network platform adopt a rear sub-platform arrangement, the rear sub-platform arrangement means that the management platform and the sensor network platform are provided with a total platform and a plurality of sub-platforms, and control information and parameter configuration information of the object platform are transmitted from the sub-platform to the total platform, and the perception information is transmitted from the total platform to the sub-platform;

the intelligent manufacturing method is a method for processing a blank, a process of processing the blank at least includes casting, forging, and/or punching, and the method comprises:

when configuring the object platform parameters, the user inputting the parameter configuration information of the object platform through the user platform, and the service platform receiving the parameter configuration information of the object platform sent by the user platform and disassembling it into multiple sets of configuration data groups according to process; the management platform storing and processing the received configuration data groups and sending them to the sensor network platform, and the stored configuration data group being used as a reference data group; the sensor network platform storing and processing the received configuration data groups and sending them to the object platform, and the object platform completing a parameter configuration of the object platform according to the parameter configuration information of the object platform; and when the production line device of the object platform is running, the object platform sending the perception information as a verification data group to the management platform through the sensor network platform at a set time interval; the management platform receiving and processing the verification data group sent by the object platform, identifying the process, acquiring the verification data group of a corresponding process, the verification data group being acquired data for verifying whether the process is normally executed, processing the verification data group through an abnormality judgment model to acquire a processed verification data group, the processed verification data group at least including a standard score of the production line device executing the process, and sending the reference data group and the processed verification data group corresponding to the object platform that sends the verification data group to the service platform; the service platform receiving and comparing the reference data group and the processed verification data group, if comparison between all data in the processed verification data group and the reference data group being within a set threshold range, the data being cleared and no subsequent processing being performed, if the comparisons between the data in the processed verification data group and the reference data group exceeding the set threshold range, in response to judging that the process is abnormal, a stop operation instruction being generated and sent to the management platform and fed back to the user platform, and the management platform sending it to the corresponding object platform through the sensor network platform to control the production line device to stop running, the stop running including that the management platform controls the production line device to stop processing the blank.

2. The intelligent manufacturing method of claim 1, wherein when the user platform sends the parameter configuration information to the object platform, each sub-platform of the management platform correspondingly stores and processes a set of configuration data group, the total platform of the management platform aggregates the configuration data group of all sub-platforms of the management platform, then stores and processes the configuration data group, and sends the multiple sets of configuration data groups to the sub-platforms of the sensor network platform in one-to-one correspondence; and each sub-platform of the sensor network platform stores and processes the received configuration data groups, the total platform of the sensor network platform aggregates the configuration data groups processed by all sub-platforms of the sensor network platform, then stores and processes the configuration data groups, and sends the multiple sets of configuration data groups to the object platform in the one-to-one correspondence.

3. The intelligent manufacturing method of claim 1, wherein when the service platform compares the reference data group and the verification data group, if the comparison between the data in the verification data group and the reference data group exceeds the set threshold range, the service platform also actively generates a perception information acquisition instruction and sends it to the management platform before generating the stop operation instruction, and the management platform receives the perception information acquisition instruction sent by the service platform and controls the corresponding object platform to send a current perception information according to the perception information acquisition instruction; and the object platform feeds back the current perception information as the validation data group to the management platform through the sensor network platform, the management platform receives and processes the validation data group fed back by the object platform and then sends it to the service platform, the service platform receives the validation data group and compares it with the reference data group, if the comparison between all the data in the validation data group and the reference data group are within the set threshold range, the data in the validation data group is cleared and no subsequent processing is performed, only when the comparison between the data in the validation data group and the reference data group exceeds the set threshold range, the service platform generates the stop operation instruction.

4. The intelligent manufacturing method of claim 3, wherein after the service platform generates the stop operation instruction, the service platform also actively generates the perception information acquisition instruction of a cascading process of a current process and sends it to the management platform, the management platform receives the perception information acquisition instruction sent by the service platform and controls a cascading process object platform of the currently corresponding object platform to send the current perception information according to the perception information acquisition instruction; the cascading process is an upper-level process or a lower-level process of the current process; and the cascading process object platform feeds back the current perception information as the verification data group to the management platform through the sensor network platform, the management platform receives the verification data group fed back by the cascading process object platform and processes it, then sends the reference data group and the verification data group corresponding to the cascading process object platform that sends the verification data group to the service platform, the service platform receives the verification data group and the reference data group and compares the two data groups, if the comparison between all the data in the verification data group and the reference data group are within the set threshold range, the data in the validation data group is cleared and no subsequent processing is performed, if the comparison between the data in the verification data group and the reference data group exceeds the set threshold range, the stop operation instruction is generated and sent to the management platform and fed back to the user platform, and the management platform sends it to the corresponding cascading process object platform through the sensor network platform to control a cascading process production line device to stop running.

5. The intelligent manufacturing method of claim 4, wherein when the cascading process is the lower-level process of the current process, the service platform also actively generates a cascading process perception information acquisition instruction and sends it to the management platform before generating the stop operation instruction, the management platform receives the cascading process perception information acquisition instruction sent by the service platform and control the corresponding cascading process object platform to send the current perception information according to the cascading process perception information acquisition instruction; and the cascading process object platform feeds back the current perception information as the validation data group to the management platform through the sensor network platform, the management platform receives and processes the validation data group fed back by the cascading process object platform and then sends it to the service platform, the service platform receives the validation data group and compares it with the reference data group, if the comparison between all the data in the validation data group and the reference data group are within the set threshold range, the data in the validation data group is cleared and no subsequent processing is performed, only when the comparison between the data in the validation data group and the reference data group exceeds the set threshold range, the service platform generates the stop operation instruction to control the cascading process production line device to stop running.

6. The intelligent manufacturing method of claim 1, wherein the service platform disassembles the parameter configuration information into multiple sets of configuration data groups according to the process, then the service platform also establishes a product model of a corresponding process according to data in each configuration data group and sends it to the user platform, the user sends a confirmation instruction to the service platform after confirming that the product model is correct through the user platform, and the service platform receives the confirmation instruction and processes it, and then sends the confirmed configuration data group to the management platform.

7. The intelligent manufacturing method of claim 1, wherein the service platform pre-stores pre-stored information of conventional local design of products, before the service platform disassembles the parameter configuration information of the object platform into multiple sets of configuration data groups according to the process, the service platform also screens out conventional local design information in the parameter configuration information of the object platform, and compares it with the pre-stored information of the conventional local design of the products, if all the comparison results are within a set design deviation threshold range, the service platform performs a disassembly processing, if the comparison result exceeds the set design deviation threshold range, it may be sent to the user platform; if the user confirms that the input information is correct through the user platform, the user sends the confirmation instruction to the service platform, the service platform performs the disassembly processing again, if the user modifies the input information through the user platform, the service platform compares again, and the service platform may perform the disassembly processing again until the user platform confirms it.

8. The intelligent manufacturing method of claim 1, wherein when the object platform sends the perception information as the verification data group to the management platform through the sensor network platform at the set time interval, different object platforms send the perception information in a staggered manner.

9. The intelligent manufacturing method of claim 1, wherein multiple object platforms corresponding to each process are set, when the production line device of one of the object platforms stops running, the service platform checks production condition information of the object platform with the same process as the object platform, and allocates a production amount of object platform with the same process as the object platform according to a production demand.

10. The intelligent manufacturing method of claim 1, wherein when the production line device casts the blank; the abnormality judgment model is a first model; and the verification data group includes temperature information;

the management platform inputs the temperature information into the first model, the first model outputs a first score; the temperature information includes smelting temperature information and pouring temperature information; the smelting temperature information includes temperature information of a smelted metal acquired at a first set time interval during a smelting process; and the pouring temperature information includes temperature information of a casting part acquired at a second set time interval after pouring; and if the first score exceeds a first set threshold range, the service platform determines that the casting process is abnormal and controls the production line device to stop casting the blank.

11. The intelligent manufacturing method of claim 1, wherein when the production line device forges the blank, the abnormality judgment model is a second model; and the verification data group includes a pre-pressing image and a post-pressing image of forging the blank;

the management platform inputs the pre-pressing image, the post-pressing image, and a first reference data group into the second model, the second model outputs a second score; the first reference data group includes a standard pre-pressing image and a standard post-pressing image; the standard pre-pressing image includes a standard form before forging the blank; the standard post-pressing image includes a standard form after forging the blank; and if the second score exceeds a second set threshold range, the service platform determines that the forging process is abnormal and controls the production line device to stop forging the blank.

12. The intelligent manufacturing method of claim 11, wherein the verification data group includes a sequence of images in which the blank is pressed multiple times; the standard pre-pressing image is a standard image before pressing the blank; the standard post-pressing image is a standard image after pressing the blank for last time; and the standard image includes a standard form of the blank.

13. The intelligent manufacturing method of claim 1, wherein when the production line device punches the blank, the abnormality judgment model is a third model; and the verification data group includes a pre-punching image and a post-punching image of punching the blank;

the management platform inputs the pre-punching image, the post-punching image, and a second reference data group into the third model, and the third model outputs a third score; the second reference data group includes a standard pre-punching image and a standard post-punching image; the standard pre-punching image includes the standard form before punching the blank; and the standard post-punching image includes the standard form after punching the blank; and if the third score exceeds a third set threshold range, the service platform determines that the punching process is abnormal and controls the production line device to stop punching the blank.

14. The intelligent manufacturing method of claim 13, wherein the verification data group includes a sequence of images in which the blank is punched multiple times; the standard pre-punching image is a standard image before punching the blank; and the standard post-punching image is a standard image after punching the blank for last time; and the standard image includes the standard form of the blank.

15. The intelligent manufacturing method of claim 1, wherein the management platform predicts performance of the blank after each process based on the verification data groups of various processes of processing the blank;

the service platform judges whether the performance of the blank meets a preset condition based on the reference data group; and the reference data group includes standard data of the process; and in response to judging that the performance of the blank does not meet a preset condition, processing the blank is stopped.

16. The intelligent manufacturing method of claim 15, wherein the management platform predicts the performance of the blank after each process by fitting the verification data group and historical statistical data.

17. An intelligent manufacturing system based on Industrial Internet of Things with a centralized service platform, comprising a user platform, a service platform, a management platform, a sensor network platform, and an object platform that interact in sequence; wherein the user platform is configured as a terminal device that interacts with a user, which receives input information of the user to generate an instruction and sends it to the service platform, and displays information sent by the service platform to the user, wherein the user platform is a desktop computer, a tablet computer, a notebook computer, or a mobile phone;

the service platform is configured as a first server, which receives the instruction sent by the user platform, processes it and sends it to the management platform, and acquires information required by the user from the management platform and sends it to the user platform;

the management platform is configured as a second server, which receives the instruction sent by the service platform and controls an operation of the object platform according to the instruction, and receives and stores perception information sent by the object platform;

the sensor network platform is configured as a communication network and a gateway for the management platform to interact with the object platform;

the object platform is configured as a production line device for performing manufacturing and a production line sensor for performing data collection, which receives the instruction from the management platform to run, and sends the perception information to the management platform through the sensor network platform;

the service platform adopts a centralized arrangement, and the centralized arrangement means that a platform receives data uniformly, processes data uniformly, and sends data uniformly; both the management platform and the sensor network platform adopt a rear sub-platform arrangement, the rear sub-platform arrangement means that the management platform and the sensor network platform are provided with a total platform and a plurality of sub-platforms, and control information and parameter configuration information of the object platform are transmitted from the sub-platform to the total platform, and the perception information is transmitted from the total platform to the sub-platform; wherein when configuring the object platform parameters, the user inputs the parameter configuration information of the object platform through the user platform, and the service platform receives the parameter configuration information of the object platform sent by the user platform and disassembles it into multiple sets of configuration data groups according to process; the management platform stores and processes the received configuration data groups and sends them to the sensor network platform, and the stored configuration data group is used as a reference data group; the sensor network platform stores and processes the received configuration data groups and sends them to the object platform, and the object platform completes a parameter configuration of the object platform according to the parameter configuration information of the object platform; and when the production line device of the object platform is running, the object platform sends the perception information as a verification data group to the management platform through the sensor network platform at a set time interval; the management platform receives and processes the verification data group sent by the object platform, identifies the process and acquires the verification data group corresponding to the process, the verification data group being acquired data for verifying whether the process is normally executed, the verification data group being processed through an abnormality judgment model to acquire a processed verification data group, the processed verification data group at least including a standard score of the production line device executing the process, and sends the reference data group and the processed verification data group corresponding to the object platform that sends the verification data group to the service platform; the service platform receives and compares the reference data group and the processed verification data group, if comparison between all data in the processed verification data group and the reference data group are within a set threshold range, the data is cleared and no subsequent processing is performed, if the comparisons between the data in the processed verification data group and the reference data group exceeds the set threshold range, in response to judging that the process is abnormal, a stop operation instruction is generated and sent to the management platform and fed back to the user platform, and the management platform sends it to the corresponding object platform through the sensor network platform to control the production line device to stop running, the stop running including that the management platform controls the production line device to stop processing the blank.

\* \* \* \* \*